J. BLACKBURN.
ELECTRIC ATTACHMENT FOR MOTOR VEHICLES.
APPLICATION FILED MAY 9, 1918.
1,366,553.
Patented Jan. 25, 1921.
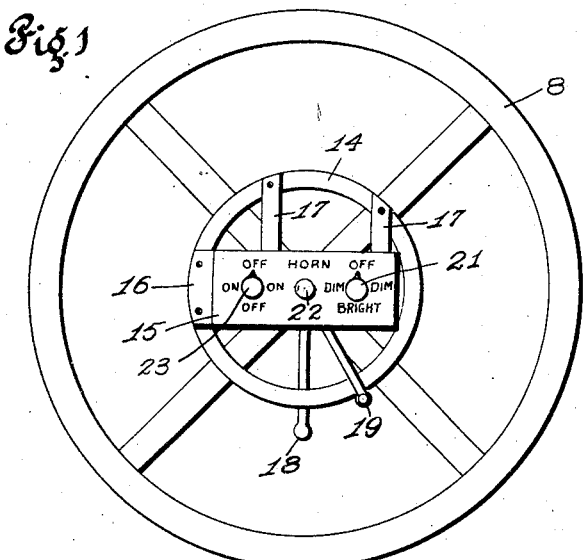
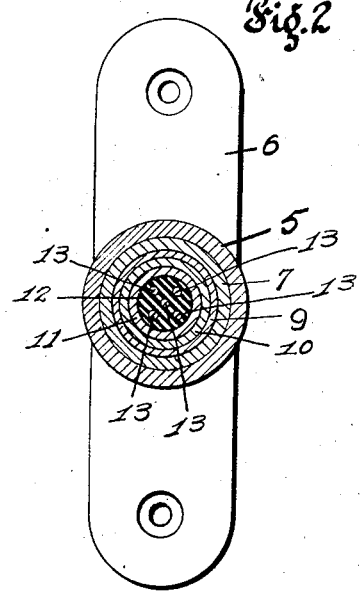
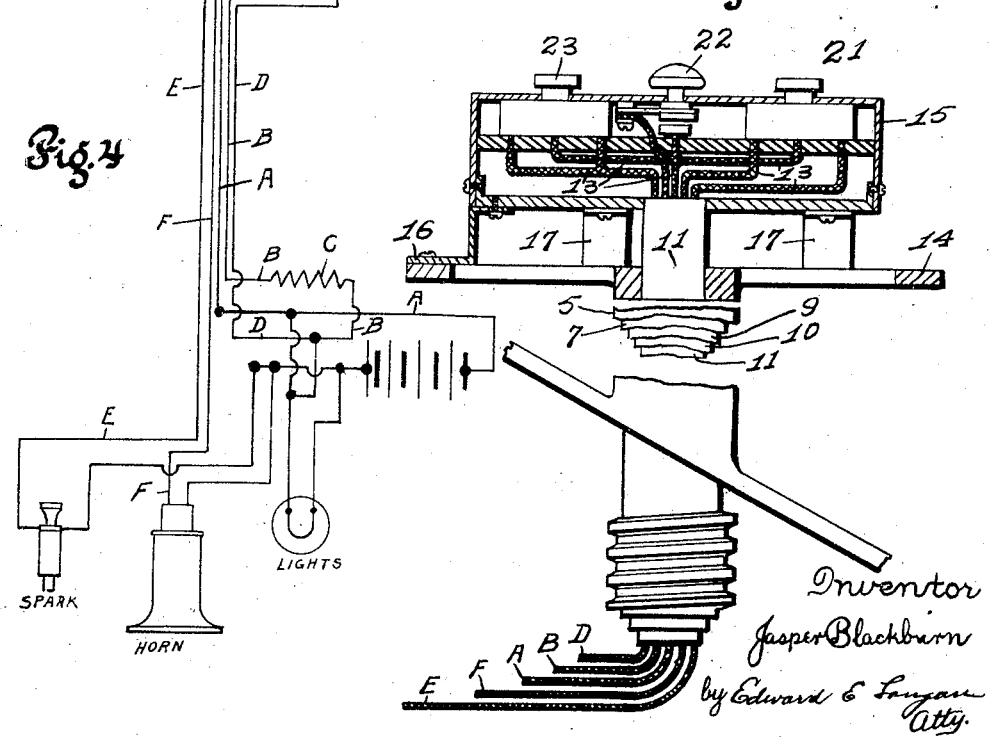
Inventor
Jasper Blackburn
by Edward E. Longan
Atty.

UNITED STATES PATENT OFFICE.

JASPER BLACKBURN, OF ST. LOUIS, MISSOURI, ASSIGNOR TO THE BLACKBURN PATENT STEERING WHEEL COMPANY, OF ST. LOUIS, MISSOURI, A CORPORATION OF MISSOURI.

ELECTRIC ATTACHMENT FOR MOTOR-VEHICLES.

1,366,553.   Specification of Letters Patent.   Patented Jan. 25, 1921.

Application filed May 9, 1918. Serial No. 233,569.

*To all whom it may concern:*

Be it known that I, JASPER BLACKBURN, a citizen of the United States, and resident of St. Louis, and State of Missouri, have invented certain new and useful Improvements in Electric Attachments for Motor-Vehicles, of which the following is a specification containing a full, clear, and exact description, reference being had to accompanying drawings, forming a part thereof.

My invention relates to certain new and useful improvements in electric attachments for motor vehicles, and has for its primary object, the employment of a switch box adapted to be carried in a fixed relation to the steering column, and the location of the electrical conductors from the switch box entirely through and within the steering column, so that the switches controlling the various translating devices, such as the horn, lights and ignition, may be readily accessible to the operator.

In the drawings,

Figure 1 is a top plan view of my invention applied in use.

Fig. 2 is a transverse section taken through the steering column, steering post and the tubes mounted therein for controlling the gasolene and spark, and also the tube in which the electrical conductors are located.

Fig. 3 is a longitudinal vertical section taken through the switch box, the steering column and inclosed parts being shown in section and illustrating the conducting wires leading through the upper end of the steering column from the switch box and entirely through the same, and passing out through the lower end of the steering column.

Fig. 4 is a diagrammatic view of the electrical circuit leading from the switches of the switch box to the various translating devices.

Referring to the drawings, 5 indicates the steering column, which is of the ordinary construction, and is secured to the foot or dash board of the automobile by means of a flange 6 in the ordinary manner. 7 indicates the steering post mounted within the steering column, to which is secured the steering wheel 8 in the ordinary manner. 9 indicates the tube by means of which the gasolene is regulated, and 10 the hollow post for operating the spark apparatus. 11 indicates a stationary tube on which the quadrant, hereinafter referred to, is mounted, and located within this tube is the cable 12 carrying the various electrical conductors 13.

The tube 11 extends through the steering column from top to bottom and within this tube or casing are located the electrical conductors which pass entirely through the steering column from the switch box, and out through the lower end of the same to the various translating devices.

14 indicates what is commercially known as a quadrant, which is mounted on the tube 11 in the well known manner. This tube 11 is mounted within the steering column in the well known manner. On this quadrant I secure the switch box 15 by means of a bracket 16 and arms 17. The bracket 16 is secured directly to the quadrant 14, and the arms 17 are secured to the quadrant and to the switch box. The switch box 15 is mounted above the quadrant, as will be observed from Fig. 3, so as to not interfere with the operation of the spark lever 19 and the gasolene lever 18.

The switch box 15 is fixed and immovable, being carried by the stationary tube 11 on which the quadrant 14 is mounted. In the switch box 15 I employ a suitable number of electric contact making and breaking devices in the form of a switch 21 which controls the lighting, a switch 22 for the horn, and a switch 23 for the ignition. In the form shown, the switches 21 and 23 are of the rotary type, and the switch 22 is of the push button type. Of course, the number of switches employed depends upon the number of translating devices used.

In Fig. 4 I have illustrated diagrammatically, the different circuits, wherein A illustrates the main circuit, which is connected to the different switches. Light switch 21 is connected so as to form the connection with the secondary circuit B, and when the switch is thrown on this circuit, the current will have to pass through the resistance coil C, dimming the light, and when the switch is thrown in the opposite direction to complete the circuit D, the light is turned on in full force, the resistance coil being cut out. When the switch 23 is thrown on to the wire E, the spark plug is thrown in circuit, and when the button 22 is pressed down, the circuit F leading to the horn is closed.

In other words, by operating the switch 21 to the left, the current will pass from the battery through the wire A, into the switch 21, thence through the wire B into resistance coil C, thence into the lamp and back into the battery, making a complete circuit.

When the switch 21 is thrown in the opposite direction, the current will pass from the wire A through the switch, into the wire D, through the lamp, into the battery, making a complete circuit. By pressing the button 22, the current passes from the battery into the wire A, thence to the button, returning through the wire F into the horn, and back into the battery, and moving the switch 23, the current first passes through wire A, through the switch, into wire E, and thence through the spark plug, and back into the battery.

As previously pointed out, the switch box is stationary relative to the steering column, being mounted on the quadrant, which is carried by a stationary tube, located within the steering column. In other words, the quadrant may be said to be carried indirectly by the steering column, or it may be said that the switch box mounted on the quadrant is carried by the steering column.

By the construction, as previously set forth, it is obvious that I provide a simple and efficient device, which the driver may use without removing his hands from the steering wheel to electrically control and operate the horn, light and ignition, or any other translating device which may be used. The switch box being stationary, it is readily accessible for use, regardless of the position the steering wheel may assume.

By immovably mounting the switch box and leading the electrical conductors from the switches within the switch box down and entirely through the steering column to the translating devices, it will be seen that regardless of the position of the steering wheel, the various translation devices are under the control of the driver at all times, without the necessity of removing his hands from the steering wheel. Furthermore, such an arrangement thoroughly conceals and protects all the electrical conductors, and prevents them from being subjected to any stress or torsion in the operation of the device.

Having fully described my invention, what I claim is:—

1. In an electrical attachment for motor vehicles a steering post adapted to carry a steering wheel, a stationary conduit located within said steering post, a quadrant mounted on said stationary conduit, a switch box mounted on the upper end of the stationary conduit, and secured to said quadrant, switches mounted in said switch box, and a series of electrical conductors secured to the switches and located within said stationary conduit.

2. The combination with a steering column, steering post and steering wheel, of a stationary conduit located within the steering post and projecting beyond both ends thereof, a switch box mounted on the upper end of said stationary conduit, switches located in the switch box, and an electric cable mounted within said stationary conduit and connected to the switches.

3. In an electrical attachment for motor vehicles a tubular steering post adapted to carry a steering wheel, a stationary conduit located within said steering post, and extending above the upper end thereof, a quadrant mounted on the conduit, a switch box mounted on the upper end of the stationary conduit and communicating therewith, switches mounted in the said switch box, means for maintaining the switch box in rigid position on the quadrant, and a series of electrical conductors secured to the switches and located within said stationary conduit and passing entirely therethrough.

4. In an electrical attachment for motor vehicles a tubular steering post adapted to carry a steering wheel, a stationary conduit located within said steering post and projecting above the upper end thereof, a switch box mounted on the upper end of said stationary conduit, switches located in said switch box, a quadrant secured near the upper end of said stationary conduit and below the switch box, means for securing the switch box to the quadrant, and an electric cable threaded through the conduit and connected to the several switches.

5. In an electrical attachment for motor vehicles a steering post adapted to carry a steering wheel, a stationary conduit located in said steering post and projecting above the upper end thereof, a quadrant mounted on said stationary conduit and above the steering wheel, a switch box mounted on the upper end of the stationary conduit and above the quadrant and located centrally of the steering wheel, switches located in said switch box, and an electric cable mounted in said stationary conduit and extending entirely therethrough and secured to the switches.

In testimony whereof, I have signed my name to this specification, in the presence of two subscribing witnesses.

JASPER BLACKBURN.

Witnesses:
WALTER C. STEIN,
ELIZABETH SCHLITT.